United States Patent
Kim et al.

(10) Patent No.: US 10,057,397 B2
(45) Date of Patent: Aug. 21, 2018

(54) WIRELESS HEADSET AND METHOD OF CONTROLLING THE SAME

(71) Applicant: LG ELECTRONICS INC., Seoul (KR)

(72) Inventors: Jaeyoung Kim, Seoul (KR); Kunwoo Lee, Seoul (KR); Youngrong Kim, Seoul (KR); Jungmun Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/506,161

(22) PCT Filed: Aug. 25, 2014

(86) PCT No.: PCT/KR2014/007871
§ 371 (c)(1),
(2) Date: Feb. 23, 2017

(87) PCT Pub. No.: WO2016/032011
PCT Pub. Date: Mar. 3, 2016

(65) Prior Publication Data
US 2017/0272561 A1    Sep. 21, 2017

(51) Int. Cl.
| | | |
|---|---|---|
| *H04M 1/00* | (2006.01) |
| *H04M 1/60* | (2006.01) |
| *H04R 1/08* | (2006.01) |
| *H04R 1/10* | (2006.01) |
| *H04M 1/05* | (2006.01) |

(52) U.S. Cl.
CPC .......... *H04M 1/6066* (2013.01); *H04M 1/05* (2013.01); *H04R 1/08* (2013.01); *H04R 1/105* (2013.01); *H04R 1/1033* (2013.01); *H04M 2250/02* (2013.01)

(58) Field of Classification Search
CPC .... H04M 1/6066; H04M 1/05; H04R 1/1033; H04R 1/05; H04R 2225/02
See application file for complete search history.

(56) References Cited

U.S. PATENT DOCUMENTS

| | | | | |
|---|---|---|---|---|
| 5,406,638 | A | * | 4/1995 | Hirschhorn ............ H04R 1/406 379/202.01 |
| 2002/0022394 | A1 | * | 2/2002 | Fukuda .............. H01R 13/6271 439/357 |
| 2007/0003093 | A1 | | 1/2007 | Ito et al. |
| 2008/0161066 | A1 | | 7/2008 | Reda et al. |
| 2008/0187162 | A1 | | 8/2008 | Lee |

(Continued)

FOREIGN PATENT DOCUMENTS

| | | |
|---|---|---|
| JP | 2007-13873 A | 1/2007 |
| KR | 10-0809232 B1 | 3/2008 |

(Continued)

*Primary Examiner* — Tuan D Nguyen
(74) *Attorney, Agent, or Firm* — Birch, Stewart, Kolasch & Birch, LLP (57) ABSTRACT

Disclosed is a wireless headset including: a main body; sub-bodies detachably attached to both lateral ends of the main body by a retractable cable; earpieces detachably attached to the sub-bodies and configured to output a sound when supportedly installed in the sub-bodies; and a controller configured to output the sound wirelessly through the earpieces when the earpieces are separated from the sub-bodies.

18 Claims, 9 Drawing Sheets

(56) References Cited

U.S. PATENT DOCUMENTS

| | | | |
|---|---|---|---|
| 2010/0045928 A1* | 2/2010 | Levy | H04M 1/05 351/158 |
| 2010/0172522 A1 | 7/2010 | Mooring et al. | |
| 2012/0099738 A1* | 4/2012 | Lee | H04R 1/105 381/74 |
| 2012/0140973 A1* | 6/2012 | Olodort | H04R 1/1066 381/375 |
| 2013/0196721 A1 | 8/2013 | Waterman et al. | |
| 2013/0256345 A1* | 10/2013 | Larkin | A45C 11/00 224/201 |
| 2013/0329903 A1* | 12/2013 | Ting | H04R 1/105 381/74 |
| 2014/0037102 A1* | 2/2014 | Alanis | H04R 1/1041 381/74 |
| 2015/0264474 A1* | 9/2015 | Seo | H04R 1/1091 381/74 |
| 2016/0366506 A1* | 12/2016 | Kim | H04R 5/0335 |

FOREIGN PATENT DOCUMENTS

| | | |
|---|---|---|
| KR | 10-0849138 B1 | 7/2008 |
| KR | 10-2011-0062877 A | 6/2011 |
| WO | WO 2009/078500 A1 | 6/2009 |

\* cited by examiner

[activate microphone]

[Fig. 19]

WIRELESS HEADSET AND METHOD OF CONTROLLING THE SAME

CROSS-REFERENCE TO RELATED APPLICATIONS

This application is the Nation Phase of PCT International Application No. PCT/KR2014/007871, filed on Aug. 25, 2014, which is hereby expressly incorporated by reference into the present application.

TECHNICAL FIELD

The present invention relates to a wireless headset capable of providing various usage states for a user depending on a way the user wears it, and a method of controlling the same.

BACKGROUND ART

Recently, users may use electronic devices such as a cellular phone, an MP3, and the like, wirelessly by using headsets for wireless communication in addition.

Usability of headsets for wireless communication is attributed to the advancement of near-field communication (NFC) technology such as Bluetooth™, wireless local area network (WLAN), wireless personal area network (WPAN), radio frequency identification (RFID), or the like.

Usage of headsets for wireless communication has expanded in line with the development of various new electronic devices and wireless communication technologies, but most products have been focused merely on a wireless communication function, and thus, it is required to increase usage of wireless headsets by improving structural characteristics of wireless headsets to diversify wireless communication functions thereof.

DISCLOSURE OF INVENTION

Technical Problem

Therefore, an object of the present invention is to solve the foregoing problems and any other problems.

Also, another object of the present invention is to provide a wireless headset providing various usage states for a user depending on a way the user wears the wireless headset, and a method of controlling the same.

Also, another object of the present invention is to provide a wireless headset capable of using an earpiece that can be connected to a body of the wireless headset wiredly or wirelessly by improving structural characteristics of an earpiece, thus increasing user convenience, and a control method thereof.

Solution to Problem

According to an aspect of the present invention, there is provided a wireless headset including: a main body; sub-bodies detachably attached to both lateral ends of the main body by a retractable cable; earpieces detachably attached to the sub-bodies and configured to output a sound when supportedly installed in the sub-bodies; and a controller configured to output the sound wirelessly through the earpieces when the earpieces are separated from the sub-bodies.

The wireless headset may further include a first wireless interface configured to perform wireless communication with an external audio source, wherein the controller may receive an audio signal from the audio source through the first wireless interface and output the sound through the earpieces.

The earpieces may each further include a second wireless interface configured to perform wireless communication with the first wireless interface, wherein when the earpieces are separated from the sub-bodies, the controller may activate the second wireless interface.

The first wireless interface and the second wireless interface may include at least one among a Bluetooth™ interface, a Wi-Fi interface, and near-field communication (NFC) interface.

The earpieces each may include a first sensing unit configured to sensing whether the earpieces are coupled to or separated from the sub-bodies.

The controller may receive a sensing signal indicating separation of the earpieces from the first sensing unit and activate the second wireless interface.

The earpieces each may be coupled to or separated from the sub-bodies by predetermined elasticity.

The earpieces may each include a speaker module, and when the earpieces each are installed in the sub-bodies, the controller may control the earpieces to be operated in a speaker mode to output the sound outwardly through the speaker module.

The controller may control a sound output mode of the earpieces, as a wired mode or a wireless mode depending on whether the earpieces are installed in the sub-bodies.

The wireless headset may further include a second sensing unit configured to sense whether the retractable cable has been drawn out from or inserted into the main body based on the lateral ends of the main body.

When the earpieces are separated from the sub-bodies and the retractable cable is determined to have been drawn out from the main body based on a sensing signal from the second sensing unit, the controller may switch the sound output mode of the earpieces from the wired mode to the wireless mode.

When the earpieces are separated from the sub-bodies and the retractable cable is determined to have been inserted into the main body so the sub-bodies are attached to the main body based on a sensing signal from the second sensing unit, the controller may switch the sound output mode of the earpieces from the speaker mode to the wireless mode.

In a state in which the retractable cable is drawn out from the main body, when the earpieces separated from the sub-bodies are recoupled to the sub-bodies, the controller may switch the sound output mode of the earpieces from the wireless mode to the wired mode.

In a state in which the retractable cable is inserted into the main body so the sub-bodies are attached to the main body, when the earpieces separated from the sub-bodies are recoupled to the sub-bodies, the controller may switch the sound output mode of the earpieces from the wireless mode to the speaker mode.

When the earpieces are separated from the sub-bodies while the sound is being output in the wired mode, the controller may temporarily stop outputting the sound, and when the earpieces are worn on the user's ears, the controller may resume outputting the stopped sound.

When the earpieces are separated from the sub-bodies so the sound output mode is switched to the wireless mode while the sound is being output in the wired mode, the controller may maintain sound output conditions of the wired mode.

When the earpieces are separated from the sub-bodies so the sound output mode is switched to the wireless mode while the sound is being output in the speaker mode, the controller may change the sound output conditions in the wired mode to fit the wireless mode.

The earpieces may each further include a microphone, and when the retractable cable is drawn out from the main body by a predetermined length in a state in which the earpieces are installed in the sub-bodies, the controller may activate the function of the microphones.

The controller may control a sound output volume in the speaker mode depending on a length of the retractable cable drawn out from or inserted into the main body.

The main body may be a neck band-type body.

According to another aspect of the present invention, there is provided a method of controlling a wireless headset, including: receiving an audio signal from an external audio source through a first wireless interface; and controlling a sound output mode to operate as a wired mode or a wireless mode depending on whether earpieces detachably attached to sub-bodies detachably attached to both lateral ends of a main body by a retractable cable are coupled to the sub-bodies, wherein when the earpieces are separated from the sub-bodies, a sound corresponding to the audio signal is wirelessly output through a wireless link established between a second wireless interface of the earpieces and the first wireless interface.

Advantageous Effects of Invention

The effects of the wireless headset and the control method thereof according to embodiments of the present invention are as follows.

According to at least one of embodiments of the present invention, an earpiece separated from a body of a wireless headset may output a sound wirelessly based on the wireless headset. Thus, user convenience of the wireless headset can be enhanced.

MODE FOR THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
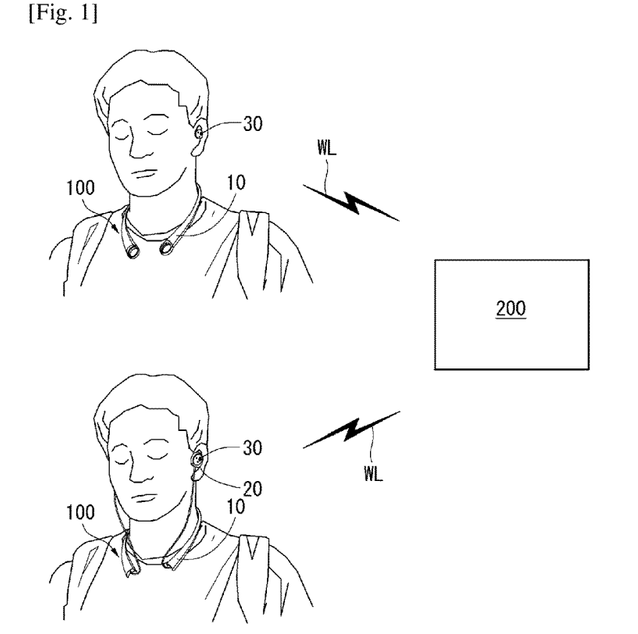
FIG. 1 is a view illustrating a user who wears a wireless headset according to an embodiment of the present invention.

FIG. 1 is a view illustrating a user who wears a wireless headset according to an embodiment of the present invention.

Referring to FIG. 1, a system of using a wireless headset according to an embodiment of the present invention may include a wireless headset 100 and an external audio source 200. The wireless headset 100 may perform wireless communication with the audio source 200 via a wireless link WL.

The wireless communication may be performed as near-field communication (NFC). The wireless headset 100 and the audio source 200 includes an NFC module (not shown), respectively. The NFC modules, which serve for short-range communication, supports short-range communication using at least one of Bluetooth™, radio frequency identification (RFID), infrared data association (IrDA), ultra wideband (UWB), ZigBee™, NFC, wireless-fidelity (Wi-Fi), Wi-Fi direct, and wireless universal serial bus (USB). The NFC modules may support wireless communication between the wireless headset 100 and a wireless communication system and between the wireless headset 100 and the external audio source 200 via a wireless area network. The WAN may be a wireless personal area network.

The external audio source 200 may include a mobile terminal, a wearable device (e.g., a smart watch, a smart glass, a head mounted display (HMD), etc.), an MP3 player, or the like, which may be able to exchange data with the wireless headset 100. However, a type of the audio source 200 is not limited thereto as long as it can transmit audio data from the wireless headset 100 according to an embodiment of the present invention.

The NFC module of the wireless headset 100 may sense (or recognize) a mobile terminal, a wearable device, or the like, that may be able to communicate with the wireless headset 100 around the wireless headset 100. Further, in a case in which the sensed terminal (mobile terminal, wearable device, or the like) is a device authenticated to communicate with the wireless headset 100 according to an embodiment of the present invention, at least a portion of data processed in the wireless headset 100 may be transmitted to the wearable device or the mobile terminal through the NFC module.

The wireless headset 100 according to an embodiment of the present invention may receive audio and any other information from the external audio source 200 through the wireless link WL established through the NFC.

The wireless headset 100 may be a neck band-type product, and wearing the wireless headset 100 around the neck, the user may wear, on the ear, an earpiece 30 that can be connected to the body of the wireless headset 100 wiredly or wirelessly.

Audio signals transmitted through the wireless link WL between the wireless headset 100 and the audio source 200 may be digitized audio sampled from an industrial standard rate of a predetermined frequency (e.g., 44.1 KHz).

The wireless headset 100 includes the earpiece 30, and the earpiece 30 may have a physical shape or size appropriate to be worn on the user's ear. Meanwhile, the earpiece 30 is detachably attached to the body of the wireless headset 100, and thus, the earpiece 30 may be separated from the body of the wireless headset 100 to operate wirelessly. Also, the earpiece 30 is separable from the body of the wireless headset 100 by a retractable cable and may be connected to the body of the wireless headset 100 by a cable to operate in a wired manner.

According to an embodiment of the present invention, the wireless headset 100 may receive an audio signal from the audio source 200 through the wireless link WL, and the earpiece 30 installed in the wireless headset 100 may be separate from the body of the wireless headset 100 wiredly or wirelessly and a sound corresponding to the audio signal may be output through the earpiece 30. Meanwhile, according to an embodiment of the present invention, when the earpiece 30 is not separated from the body of the wireless headset 100, the sound corresponding to the audio signal may be output outwardly using the earpiece 30 as a speaker.

Hereinafter, the wireless headset 100 for outputting a sound through the earpiece installed in the wireless headset 100 according to an embodiment of the present invention will be described through a basic block diagram.

Figure 2:
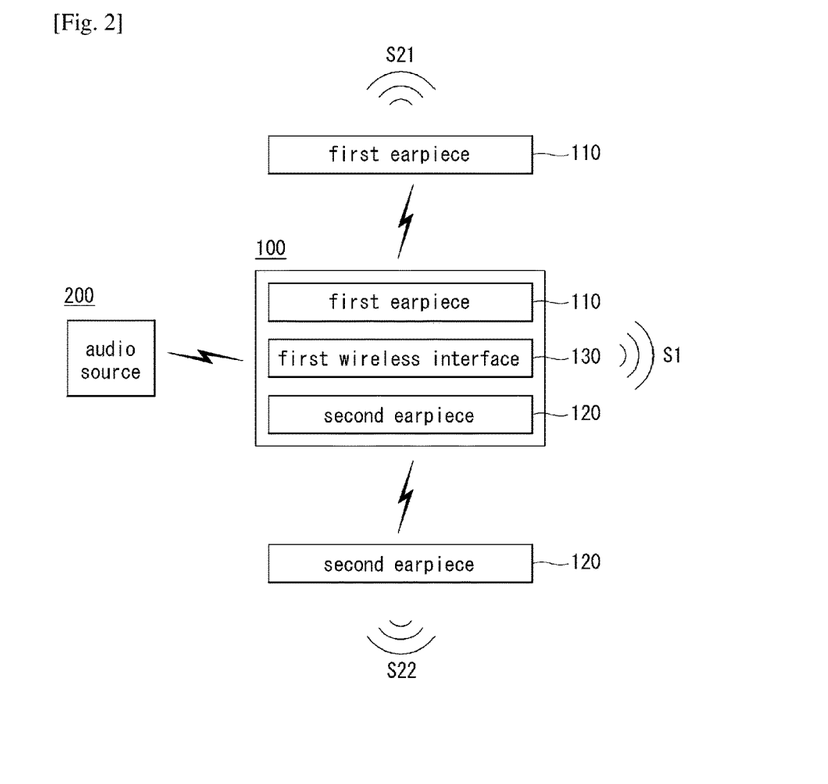
FIG. 2 is a conceptual block diagram illustrating major components of the wireless headset according to an embodiment of the present invention.

FIG. 2 is a conceptual block diagram illustrating major components of the wireless headset according to an embodiment of the present invention.

Referring to FIG. 2, the wireless headset 100 may include a first earpiece 110, a second earpiece 120, and a first wireless interface 130. The wireless headset 100 may establish a wireless link with the audio source 200 through the first wireless interface 130 and receive a predetermined audio signal from the audio source 200.

Meanwhile, in a case in which the first earpiece 110 and the second earpiece 120 are not separated from the body of the wireless headset 100, the wireless headset 100 may utilize the first earpiece 110 and the second earpiece 120 as speakers and output a sound S1 outwardly through the speakers.

Meanwhile, when the first earpiece 110 and the second earpiece 120 are separated from the body of the wireless headset 100 wiredly or wirelessly, the wireless headset 100 may utilize the first earpiece 110 and the second earpiece 120 as earphone speakers to output sounds S21 and S22. In this case, the first earpiece 110 and the second earpiece 120 may be worn on the user's ear.

When the first earpiece 110 and the second earpiece 120 are separately from the wireless headset wirelessly, the earpieces 110 and 120 may perform wireless communication with the body of the wireless headset 100 through a predetermined wireless interface to output a sound.

Figure 3:
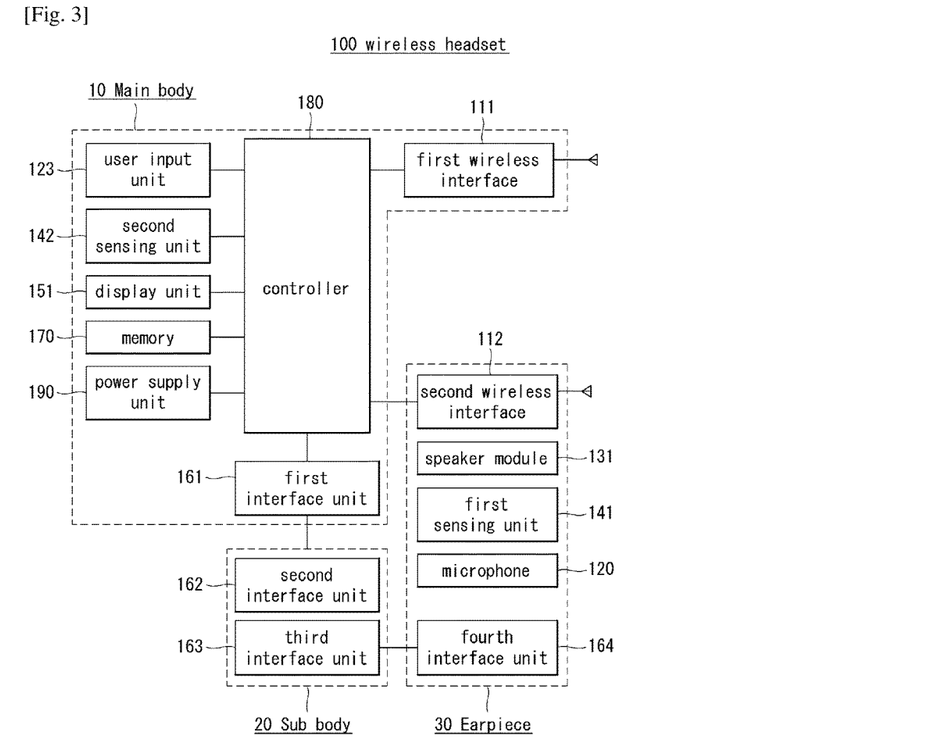
FIG. 3 is a detailed block diagram of a wireless headset according to an embodiment of the present invention.

FIG. 3 is a detailed block diagram of a wireless headset according to an embodiment of the present invention.

The wireless headset 100 may include a main body 10, a sub-body 20, and an earpiece 30. The components illustrated in FIG. 3 are not essential in implementing the wireless headset according to an embodiment of the present invention and the wireless headset described in the present disclosure may include greater or fewer components.

The main body 10 may include a first wireless interface 111, a user input unit 123, a second sensing unit 142, a display unit 151, a memory 170, and a power supply unit 190.

In detail, among the components, the first wireless interface 111 may include one or more modules allowing for wireless communication with the external audio source 200.

The user input unit 123 may include a push key (or a mechanical key) for receiving information from a user, or the like. Data collected from the user input unit 123 may be analyzed and processed as a control command of the user.

The second sensing unit 142 may sense whether the main body 10 and the sub-body 20 connected to the main body 10 by a retractable cable are coupled or separated. The second sensing unit 142 may be a sensing means positioned in a cross-section where the main body 10 and the sub-body 20 are coupled and formed of a magnetic material capable of sensing whether the main body 10 and the sub-body 20 are coupled magnetically.

The display unit 151 may have an inter-layered structure or an integrated structure with a touch sensor in order to facilitate a touch screen. The touch screen may provide an output interface between the wireless headset 100 and a user, as well as function as the user input unit 123 which provides an input interface between the wireless headset 100 and the user.

The first interface unit 161 serves as an interface with various types of external devices that can be coupled to the wireless headset 100. The first interface unit 151 is provided in the main body 10 and serves as an interface for connection with the sub-body 20. The first interface unit 151 may be a retractable cable allowing the main body 10 and the sub-body 20 to be connected therethrough.

The memory 170 may store data to support various functions of the wireless headset 100. The memory 170 may be configured to store application programs or applications executed in the wireless headset 100, and data or commands for operations of the wireless headset 100. At least some of the application programs may be downloaded from the external audio source 200 through wireless communication.

The controller 180 typically functions to control overall operation of the wireless headset 100, in addition to the operations associated with the application programs.

For example, the controller 180 may sense whether the sub-body is separated from the main body 10 by a sensing signal from the second sensing unit 142.

Also, for example, depending on whether the earpiece 30 is installed in the sub-body 20 or whether the sub-body 20 is coupled to the main body 10, the controller 180 may provide control to output a sound in any one of a wired mode, a wireless mode, and a speaker mode, as a sound output mode, through the earpiece 30.

Also, for example, when the earpiece 30 is separated from the sub-body 20, the controller 180 may receive a control signal indicating that the earpiece 30 has been separated from the sub-body 20 through a second wireless interface 112. As the earpiece 30 is separated from the sub-body 20, the controller 180 may provide control to output a sound through the earpiece 30 wirelessly.

Details of controlling a sound output mode of the earpiece 30 will be described hereinbelow.

The power supply unit 190 may be configured to receive external power or provide internal power in order to supply appropriate power required for operating elements and components included in the wireless headset 100 under the control of the controller 180. The power supply unit 190 may include a battery, and the battery may be configured as an internal battery or a replaceable battery.

The components of the main body 10 have been described so far.

The sub-body 20 may include a second interface unit 162 connected to the first interface unit 161 of the main body 10. Also, the sub-body 20 may include a third interface unit 162 connected to the earpiece 30. The third interface unit 162 may have certain elasticity such that the earpiece 30 is detachably attached, and may be configured to be elastically coupled with the earpiece 30.

The earpiece 30 may include the second wireless interface 112, a speaker module 131, a first sensing unit 141, a microphone 120, and a fourth interface unit 164.

In a state in which the earpiece 30 is separated from the sub-body 20, the second wireless interface 112 establishes a wireless link with the first wireless interface 111. The second wireless interface 112 may receive a certain audio signal from the main body 10 through the wireless link.

Also, the second wireless interface 112 may receive a control signal from the controller 180 of the main body 10, and the control signal may control a sound output mode of the earpiece 30.

In a state in which the earpiece 30 is attached to the sub-body 20 and the sub-body 20 is coupled to the main body 10, the speaker module 131 may output a sound corresponding to the audio signal outwardly. In this case, the wireless headset 100 according to an embodiment of the present invention may serve as a speaker to output an audio signal transmitted from the external audio source 200 outwardly.

The first sensing unit 141 may sense whether the earpiece 30 is separated from or coupled to the sub-body 20 and transmit a sensing signal corresponding to a state in which the earpiece 30 is separated from or coupled to the sub-body 20, to the controller 180 of the main body 10.

The microphone 120 may be provided on one side of the earpiece 30 to convert a sound input from the user into an electrical signal. The microphone 120 may be activated in a state in which the sub-body 20 is drawn from the main body 10 by a retractable cable and the earpiece 30 is not separated from the sub-body 20.

The fourth interface unit 164 may serve as an interface for connection with the sub-body 20. As described above, the fourth interface unit 164 provided in the earpiece 30, a member having certain elasticity, may be elastically coupled to the third interface unit 163 of the sub-body 20.

Hereinafter, embodiments related to a control method that may be implemented by the wireless headset configured as described above will be described with reference to the accompanying drawings. It may be obvious to a person skilled in the art that the present invention may be embodied to any other specific form without departing from the spirit and essential characteristics of the present invention.

Figure 4:
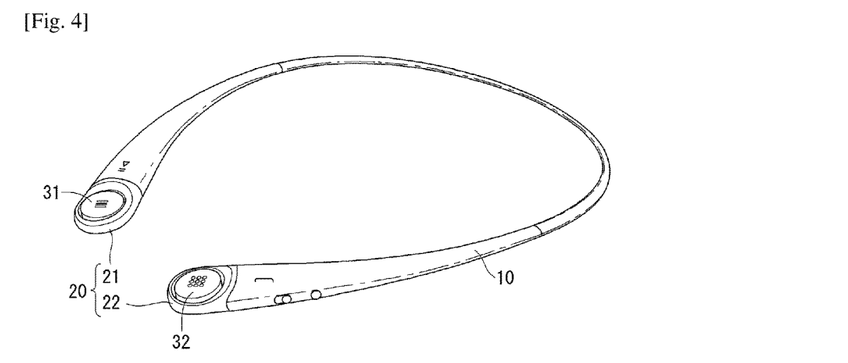
FIG. 4 is a view illustrating an appearance of a wireless headset related to an embodiment of the present invention.

FIG. 4 is a view illustrating an appearance of a wireless headset related to an embodiment of the present invention.

Referring to FIG. 4, the wireless headset according to an embodiment of the present invention includes a main body 10, sub-bodies 21 and 22 coupled to both sides of the main body 10, and earpieces 31 and 32 detachably attached to certain recesses provided in the sub-bodies 20.

The main body 10 may be designed as a neck band type so as to be worn on the user's neck.

Figure 5:
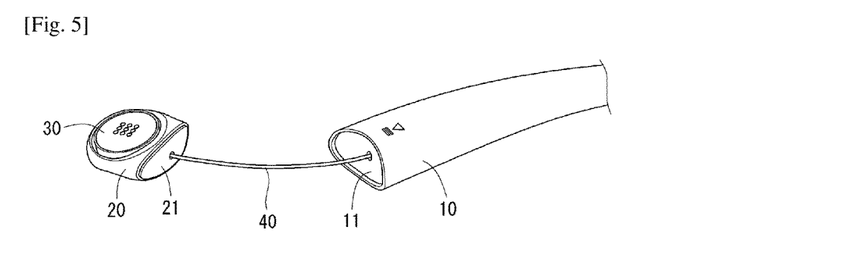
FIG. 5 is a view illustrating an example of separating a sub-body with an earpiece attached thereto from a main body in the wireless headset illustrated in FIG. 4.

FIG. 5 is a view illustrating an example of separating a sub-body with an earpiece attached thereto from the main body in the wireless headset illustrated in FIG. 4.

Referring to FIG. 5, the sub-body 20 may be connected to the main body 10 wiredly through a retractable cable 40. When the retractable cable 40 is completely inserted into the main body 10, the sub-body 20 may be attached to the main body 10. When the retractable cable 40 is drawn out from the main body 10, the sub-body 20 may not be physically attached to the main body 10 but be connected to the main body 10 wiredly by the retractable cable 40.

The sub-body 20 may have a recess on which the earpiece 30 is coupled, and the retractable cable 40 is connected to one surface 21 of the sub-body 20. Meanwhile, as the retractable cable 40 is inserted into the main body 10, the one surface 21 of the sub-body 20 may be attached to one surface 11 of the main body 10.

For example, the one surface 21 of the sub-body 20 and the one surface 11 of the main body 10 may have magnetism and may be attached to each other through magnetic coupling.

Figure 6:
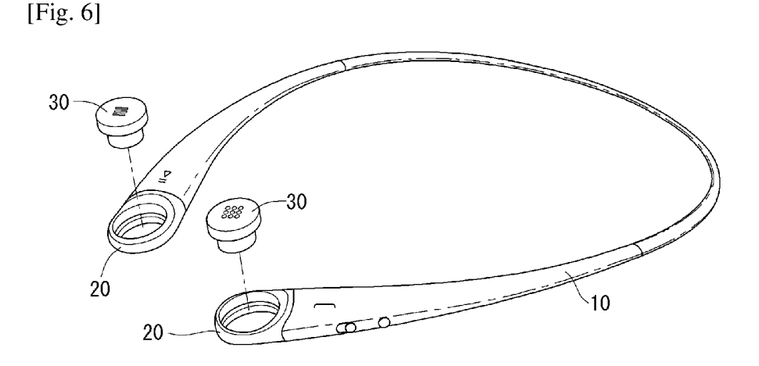
FIG. 6 is a view illustrating an example of separating earpieces from the wireless headset illustrated in FIG. 4.

FIG. 6 is a view illustrating an example of separating earpieces from the wireless headset illustrated in FIG. 4.

Referring to FIG. 6, in the wireless headset 100 according to an embodiment of the present invention, the earpiece 30 may be separated from the body. For example, the sub-body 20 includes a predetermined recess, and the earpiece 30, in a state of being inserted in the recess, may be coupled to the sub-body 20.

The earpiece 30 may be maintained in a state of being elastically coupled to the sub-body 20, and as the elastic coupling is released by external pressure, the earpiece 30 may be separated from the recess of the sub-body 20. Conversely, when the earpiece 30, separated from the sub-body 20, is inserted into the recess of the sub-body 20, the earpiece 30 may be recoupled to the sub-body 20 through certain elastic coupling. In the foregoing example, the sub-body and the earpiece 30 are coupled by an elastic member, but the present invention is not limited thereto and the sub-body 20 and the earpiece 30 may be coupled by any member as long as it allows the sub-body 20 and the earpiece 30 to be detachably attached.

Figure 7:
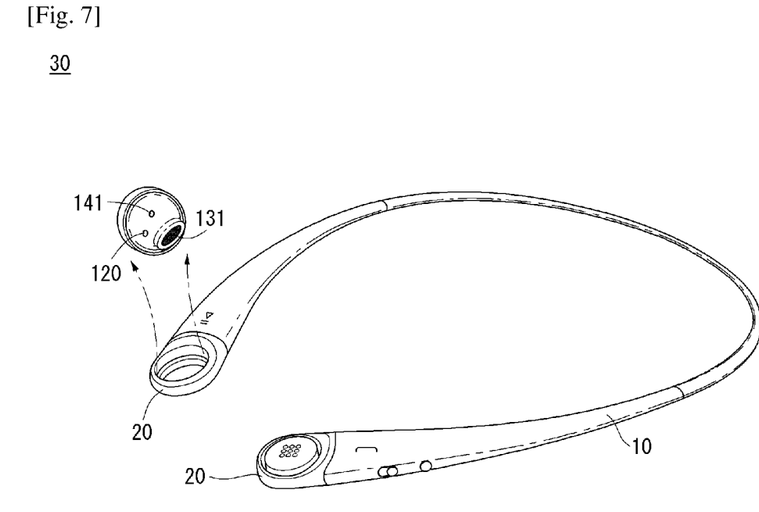
FIG. 7 is a view illustrating an appearance of the earpiece separated from the body of the wireless headset according to an embodiment of the present invention.

FIG. 7 is a view illustrating an appearance of the earpiece separated from the body of the wireless headset according to an embodiment of the present invention.

Referring to FIG. 7, certain components may be mounted on a surface of the earpiece 30 opposing the side of the earpiece 30 worn on the user's ear. For example, the earpiece 30 may have the microphone 120, the first sensing unit 141, and the speaker module 131 on one surface of the body of the earpiece 30.

The first sensing unit 141 may sense whether the earpiece 30 is separated from the sub-body 20, and when the earpiece 30 is separated from the sub-body 20, the first sensing unit 141 may be wirelessly connected to the wireless headset 100 to output a sound.

In a state in which the earpiece 30 is coupled to the sub-body 20 and the sub-body is attached to the main body 10, the speaker module 131 outputs a sound corresponding to an audio signal received from the external audio source 200. Namely, the controller 180 of the wireless headset 100 may differently control a sound output mode differently depending on whether the earpiece 30 is coupled to the sub-body 20 and the main body 10.

Figure 8:
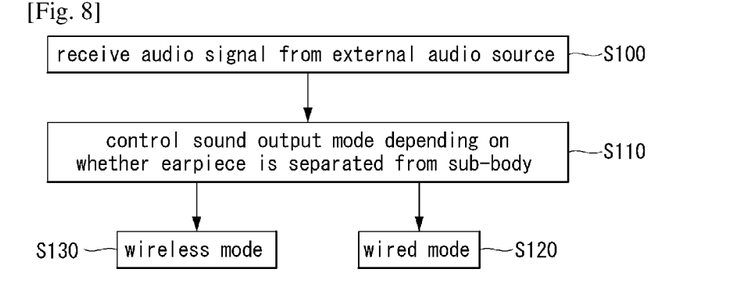
FIG. 8 is a flow chart illustrating a method of controlling a wireless headset according to an embodiment of the present invention.

FIG. 8 is a flow chart illustrating a method of controlling a wireless headset according to an embodiment of the present invention.

Referring to FIG. 8, the controller 180 of the wireless headset 100 according to an embodiment of the present invention may establish a wireless link with an external audio source and receive an audio signal from the audio source, in step S100.

The controller 180 may control a sound output mode depending on whether the earpiece is separated from the sub-body, in step S110.

When it is determined that the earpiece is coupled to the sub-body, the controller 180 provide control such that an audio signal transmitted from the external audio source is output wiredly in relation to the earpiece, in step S120.

Namely, although the wireless headset 100 is connected to the external audio source 200 wirelessly, when it comes to only the earpiece in the wireless headset 100 itself, a case in which the earpiece, in a state of being connected to the wireless headset 100 wiredly, outputs a sound may be considered a wired mode.

Meanwhile, the wired mode may be divided into two types. For example, in a case in which the earpiece is coupled to the sub-body and the sub-body is coupled to the main body, the earpiece is utilized as a speaker to output a sound in a speaker mode. Also, in a case in which the sub-body is drawn out from the main body by a retractable cable, the earpiece is utilized as an earphone speaker to output a sound in the wired mode.

Also, a case in which the earpiece, in a state of being connected to the wireless headset wirelessly, outputs a sound may be considered as a wireless mode.

When it is determined that the earpiece is separated from the sub-body, the controller 180 controls the sound output mode to be operated in the wireless mode, in step S130.

Figure 9:
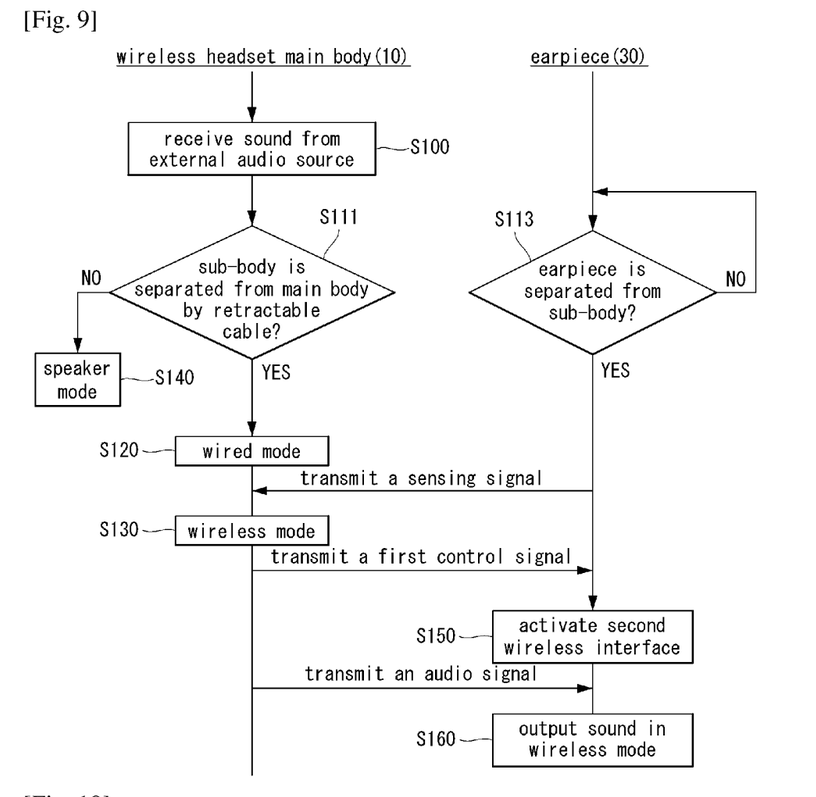
FIG. 9 is a flow chart specifically illustrating a method of controlling a wireless headset according to an embodiment of the present invention.

FIG. 9 is a flow chart specifically illustrating a method of controlling a wireless headset according to an embodiment of the present invention.

Referring to FIG. 9, the wireless headset 100 may control the sound output mode of the earpiece 30 under the control of the controller included in the main body 10.

The controller 180 may receive a sound from the external audio source, in step S100.

The controller 180 may determine whether the sub-body is separated from the main body by the retractable cable, in step S111.

In a case in which the sub-body is separated from the main body by the retractable cable, the controller 180 may set the sound output mode of the earpiece to the wired mode and output a sound through the earpiece in the wired mode, in step S120.

Meanwhile, when the sub-body is coupled to the main body, rather than being separated therefrom, the controller 180 may utilize the earpiece as a speaker and control the earpiece to output a sound in the speaker mode, in step S140.

Meanwhile, the controller 180 may receive a sensing signal regarding whether the earpiece is separated, from the earpiece 30.

For example, the first sensing unit 141 of the earpiece 30 may determine whether the earpiece 30 is separated from the sub-body 20, in step S113.

When the earpiece 30 is separated from the sub-body, the earpiece 30 may transmit a sensing signal of the first sensing unit 141 to the wireless headset 100 connected via a wireless link.

Accordingly, the wireless headset 100 may control the sound output mode of the earpiece is operated in the wireless mode, in step S130.

The controller 180 may transmit a first control signal to the earpiece 30 to enable the earpiece 30 to activate the second wireless interface, in step S150.

Here, the second wireless interface may include an NFC module, like the first wireless interface included in the main body 10 of the wireless headset 100. As the second wireless interface is activated, the earpiece 30 may output a sound in the wireless mode.

After the second wireless interface of the earpiece 30 is activated, the controller 180 may transmit an audio signal received from the external audio source 200 to the earpiece 30. Accordingly, the controller 180 may provide control such that a sound is output in the wireless mode through the earpiece 30 separated from the wireless headset 100, in step S160.

Figure 10:
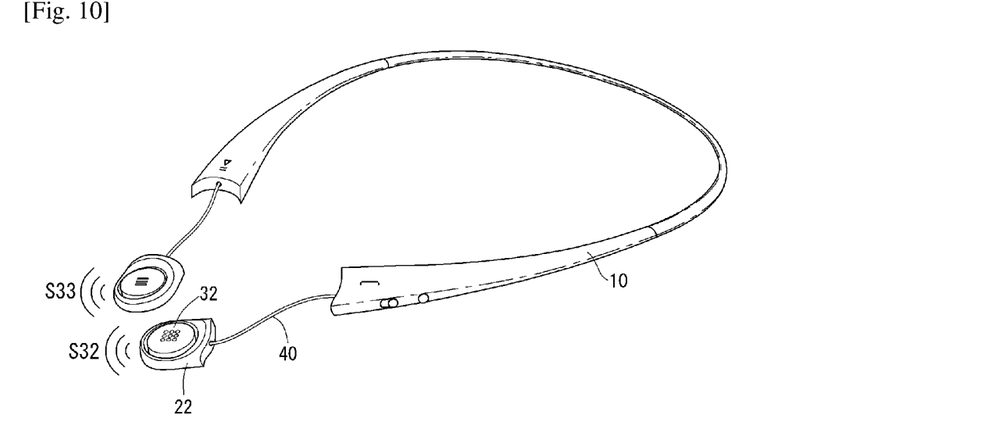
FIG. 10 is a conceptual view of outputting a sound in a wired mode from the wireless headset according to an embodiment of the present invention.

FIG. 10 is a conceptual view of outputting a sound in a wired mode from the wireless headset according to an embodiment of the present invention.

Referring to FIG. 10, as the retractable cable 40 is drawn out from the main body 10 of the wireless headset 100, the sub-body 22 may be separated from the main body 10. When the retractable cable 40 is drawn out from the main body 10, the sub-body 20 coupled to the earpiece 32 may be worn on the user's ear. In this case, the controller 180 provides control such that a sound is output in the wired mode through the earpiece 32.

Meanwhile, when the retractable cable 40 is inserted into the main body 10 so the sub-body 22 is attached to the main body 10, the controller 180 may control the sound output mode of the earpiece to be the speaker mode. Thus, when the sub-body 22 is separated from the main body 10, the controller 180 may switch the sound output mode of the earpiece 32 from the speaker mode to the wired mode.

Figure 11:
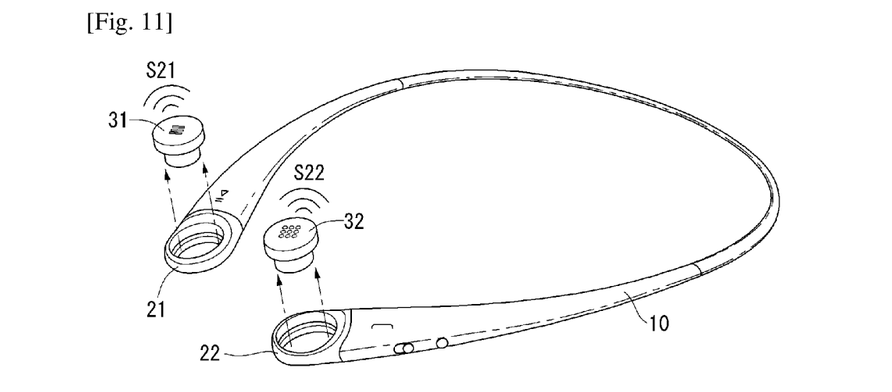
FIG. 11 is a conceptual view of outputting a sound in a wireless mode from the wireless headset according to an embodiment of the present invention.

FIG. 11 is a conceptual view of outputting a sound in a wireless mode from the wireless headset according to an embodiment of the present invention.

Referring to FIG. 11, when the ear pieces 31 and 32 are separated from the sub-bodies 21 and 22, the controller 180 of the wireless headset 100 may control the sound output mode of the earpieces 31 and 32 to be operated in the wireless mode.

For example, when the sub-body 20 is coupled to the main body 10 at a point in time at which the earpieces 31 and 32 are separated from the sub-bodies 21 and 22, the controller 180 may switch the sound output mode of the earpieces 31 and 32 from the speaker mode to the wireless mode.

Also, for example, when it is determined that the sub-body 20 is separated from the main body 10 by the retractable cable 40 at a point in time at which the earpieces 31 and 32 are separated from the sub-bodies 21 and 22, the controller 180 may switch the sound output mode of the earpieces 31 and 32 from the wired mode to the wireless mode.

Figure 12:
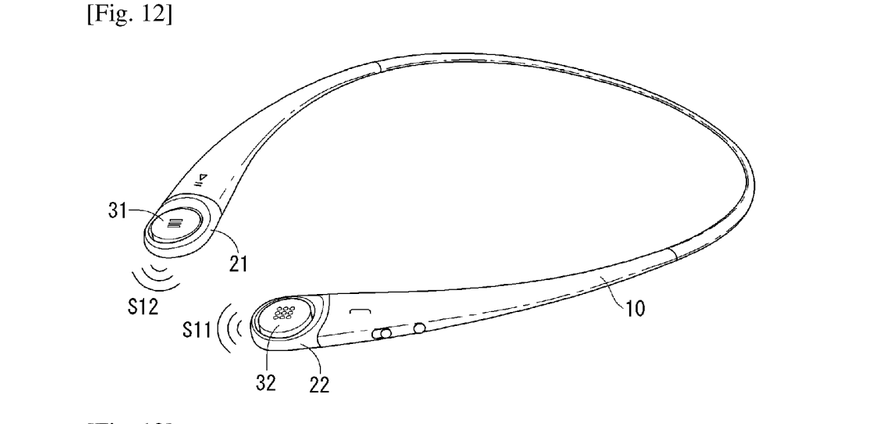
FIG. 12 is a conceptual view of outputting a sound in a speaker mode from the wireless headset according to an embodiment of the present invention.

FIG. 12 is a conceptual view of outputting a sound in a speaker mode from the wireless headset according to an embodiment of the present invention.

Referring to FIG. 12, the wireless headset 100 receives an audio signal from the external audio source 200 and, here, in terms of the audio source 200, a sound is output wirelessly through the wireless headset 100

However, in terms of the wireless headset 100, a sound may be output either in the wired mode or in the wireless mode depending on whether the earpiece 30 is separated from the body of the wireless headset 100.

Meanwhile, in the case of FIG. 12, in terms of the external audio source 200, the wireless headset 100 may serve as a speaker wirelessly connected to the audio source 200. In particular, since a sound is output through the earpieces 31 and 32, the earpieces 31 and 32 serve as speakers.

Although not shown in FIG. 12, the earpieces 31 and 32 may be controlled to operate in the speaker mode when the earpieces 31 and 32 are separated from the sub-body 20 or when the sub-body 20 is separated from the main body 10 and the earpieces 31 and 32 are separated from the sub-body 20.

So far, the examples in which a sound is output in the wireless mode when the earpiece is separated from the wireless headset according to an embodiment of the present invention has been described. Hereinafter, controlling the sound output mode when the earpiece that outputs a sound in the wireless mode is coupled again to the wireless headset will be described.

Figure 13:
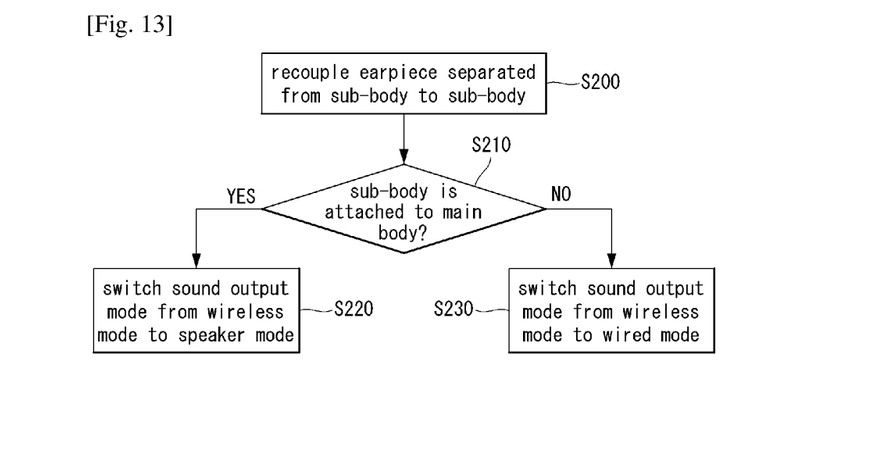
FIG. 13 is a flow chart illustrating another example of a method of controlling a wireless headset according to an embodiment of the present invention.

FIG. 13 is a flow chart illustrating another example of a method of controlling a wireless headset according to an embodiment of the present invention.

Referring to FIG. 13, the controller 180 of the wireless headset 100 may sense that the earpiece separated from the sub-body is recoupled to the sub-body, in step S200.

For example, whether the earpiece 30 is coupled to the sub-body 20 may be sensed through the first sensing unit 141. When it is determined that the earpiece 30 is coupled to the sub-body 20 according to the sensing result of the first sensing unit 141, the first sensing unit 141 may transmit a sensing signal to the controller 180 of the wireless headset 100 and the controller 180 may control the sound output mode of the earpiece to be switched from the wireless mode to the wired mode or the speaker mode.

After determining that the earpiece is recoupled with to the sub-body, the controller 180 may determine whether the sub-body is attached to the main body or separated from the main body in step S210, and control the sound output mode differently depending on whether the sub-body is attached.

For example, when the earpiece is recoupled to the sub-body, if the sub-body is in a state of being attached to the main body (S210: YES), the controller 180 may switch the sound output mode of the earpiece from the wireless mode to the speaker mode.

Also, for example, when the earpiece is recoupled to the sub-body, if the sub-body is in a state of being separated from the main body (S210: NO), the controller 180 may switch the sound output mode of the earpiece from the wireless mode to the wired mode.

Figure 14:
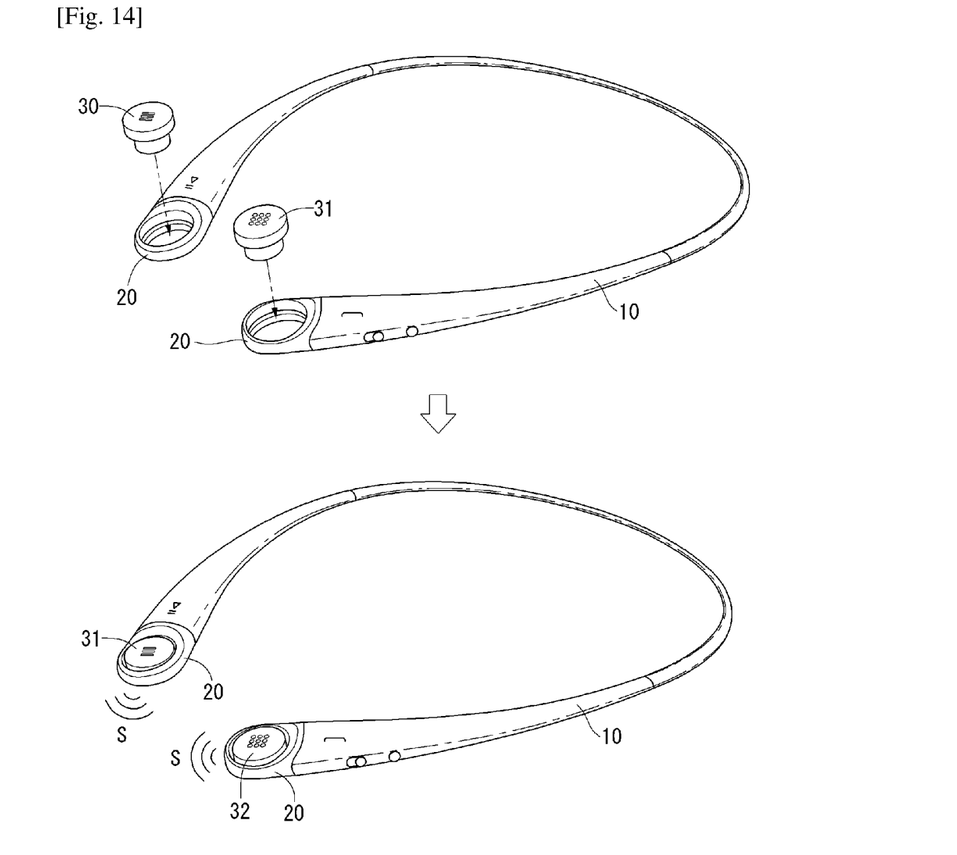
FIGS. 14 and 15 are views illustrating the embodiment illustrated in FIG. 13.
Figure 15:
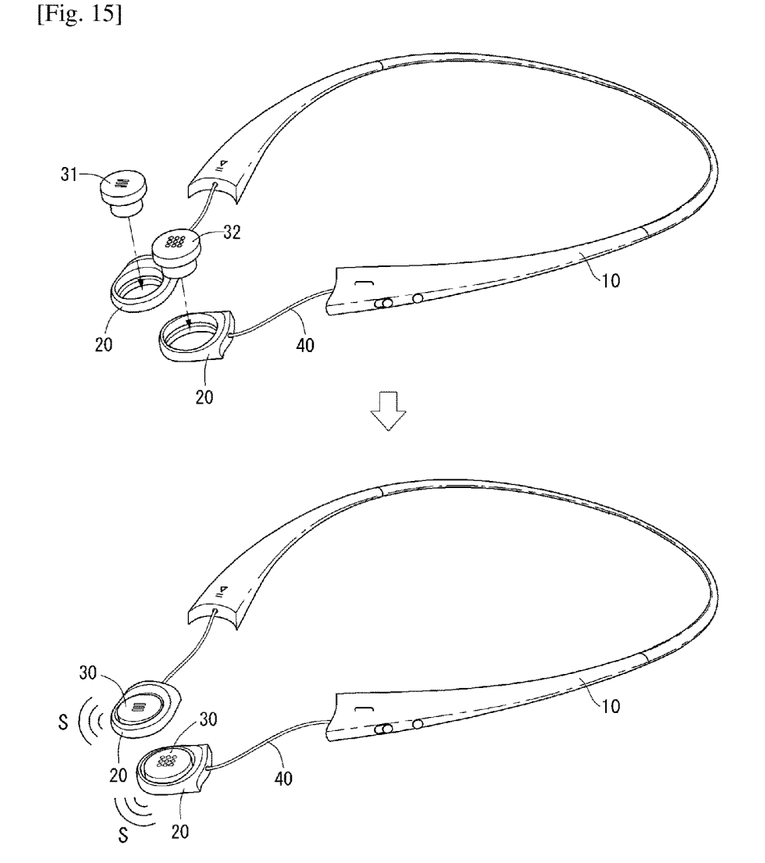

FIGS. 14 and 15 are views illustrating the embodiment illustrated in FIG. 13.

Referring to FIG. 14, in a state in which the sub-body 20 is attached to the main body 10, when the earpiece 30 is recoupled to the sub-body 20, the controller 180 of the wireless headset 100 may switch the sound output mode of the earpiece from the wireless mode to the speaker mode. Accordingly, the earpiece 30 may operate as a wireless speaker of the external audio source 200 to output a certain sound S.

Meanwhile, referring to FIG. 15, in a case in which the retractable cable 40 is drawn out from the main body 10 to separate the body 20 from the main body 10, when the earpiece 30 is recoupled to the sub-body 20, the controller 180 may switch the audio output mode of the earpiece 30 from the wireless mode to the wired mode.

Meanwhile, according to embodiments of the present invention, when the sound output mode is switched, sound output conditions may be changed or maintained. For example, in a state in which the user wears the earpieces on his or her ears and listen to music in the wired mode, the earpieces may be separated from the sub-bodies. Also, for example, while a sound is being output in the speaker mode by utilizing the wireless headset 100 as a speaker, the earpieces may be separated from the sub-bodies. In this case, the wireless headset 100 according to an embodiment of the present invention may appropriately change conditions of sound output according to a situation in which the user listens to a sound to provide an optimal sound listening environment.

Figure 16:
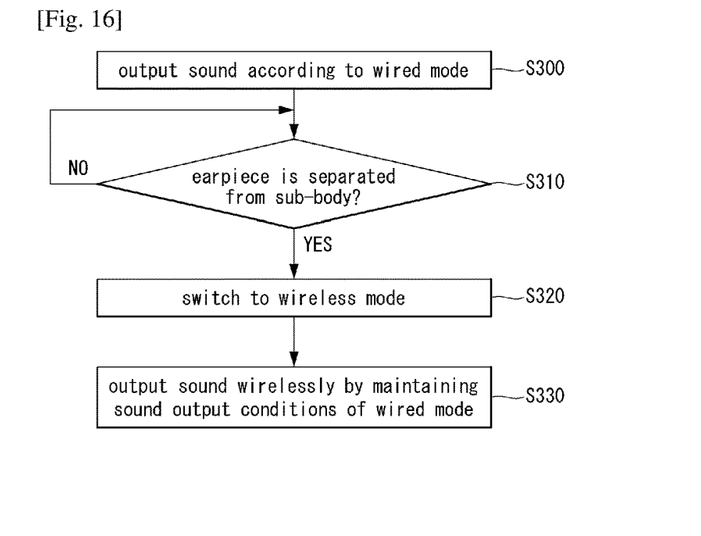
FIG. 16 is a flow chart illustrating another example of a method of controlling a wireless headset according to an embodiment of the present invention.

FIG. 16 is a flow chart illustrating another example of a method of controlling a wireless headset according to an embodiment of the present invention.

Referring to FIG. 16, the wireless headset 100 may set the sound output mode of the earpiece to the wired mode to output a sound, in step S300.

When the earpiece is separated from the sub-body in step S310, the controller 180 may switch the sound output mode of the earpiece from the wired mode to the wireless mode in step S320.

Meanwhile, the controller 180 may output a sound wirelessly, while maintaining the sound output conditions in the wired mode in step S330.

Also, the controller may output a sound by appropriately changing the sound output conditions in the wired mode according to a wireless environment.

Figure 17:
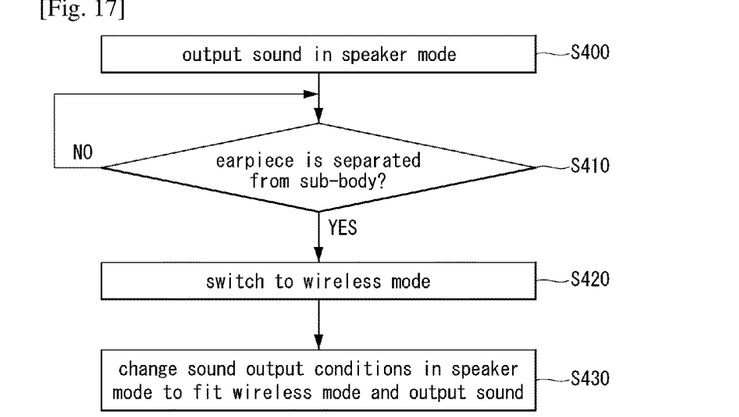
FIG. 17 is a flow chart illustrating another example of a method of controlling a wireless headset according to an embodiment of the present invention.

FIG. 17 is a flow chart illustrating another example of a method of controlling a wireless headset according to an embodiment of the present invention.

Referring to FIG. 17, the wireless headset 100 may set the sound output mode of the earpiece to the speaker mode and utilize the earpiece as a speaker, in step S400.

The speaker mode may operate in a state in which the earpiece is coupled to the sub-body or in a state in which the sub-body with the earpiece coupled thereto is attached to the main body.

When the earpiece is separated from the sub-body in step S410, the controller 180 may switch the sound output mode of the earpiece from the speaker mode to the wireless mode in step S420.

As the sound output mode is switched from the speaker mode to the wireless mode, the controller 180 may appropriately change the sound output conditions in the speaker mode to fit the wireless mode, and output a sound in step S430.

Figure 18:
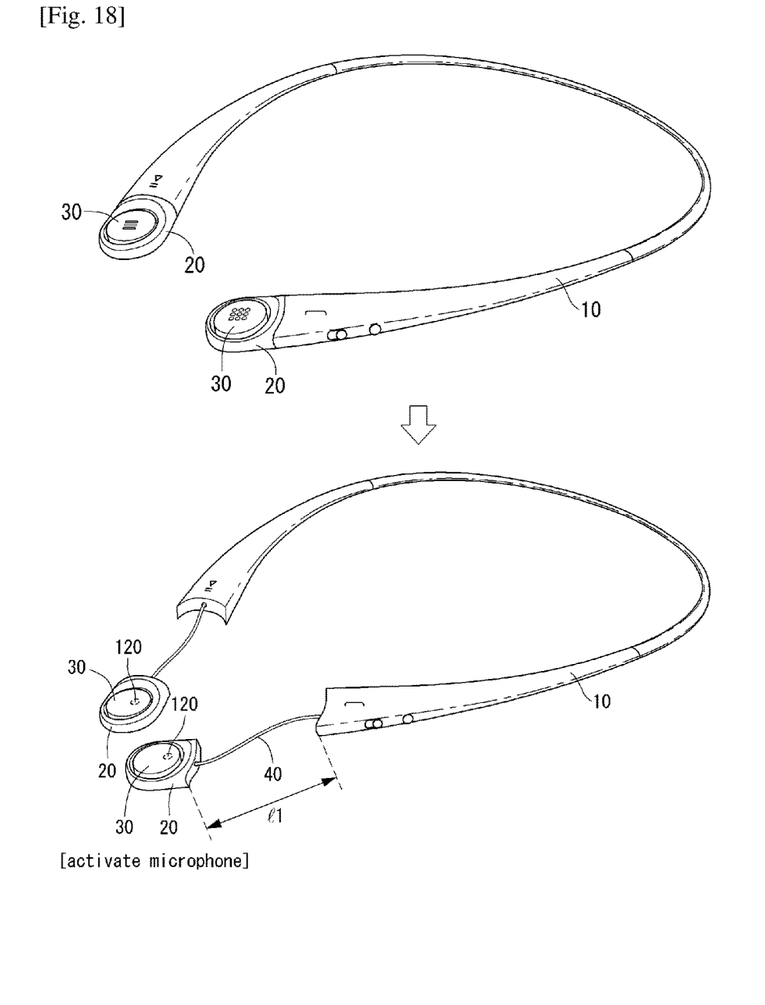
FIGS. 18 and 19 are views illustrating examples of using a wireless headset according to an embodiment of the present invention.
Figure 19:
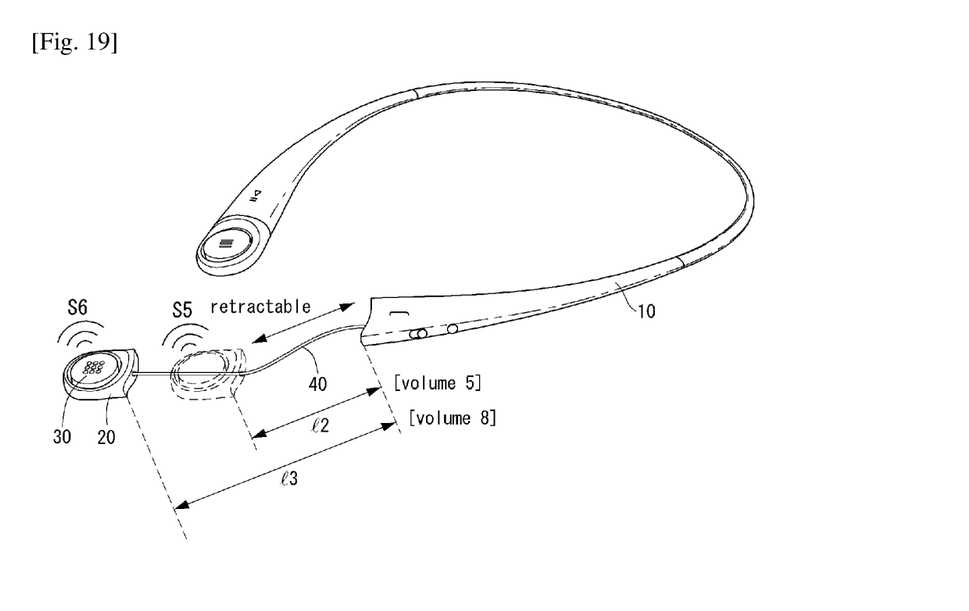

FIGS. 18 and 19 are views illustrating examples of using a wireless headset according to an embodiment of the present invention.

Referring to FIG. 18, the earpiece of the wireless headset 100 according to an embodiment of the present invention may further include a microphone 120. The microphone 120 may be provided in a direction opposite a direction of the earpiece in which a sound is output. However, in a case in which the sub-body 20 with the earpiece 30 coupled thereto is attached to the main body 10 and the user wears the neck band-type wireless headset 100 around the neck, utilization of the microphone provided in the earpiece is lowered. Thus, in the case in which the sub-body 20 is attached to the main body 10, the controller 180 may not activate the microphone 120 of the earpiece 30.

However, although the user wears the wireless headset 100 around the neck, if the retractable cable is drawn out from the main body 10 so the sub-body 20 is separated from the main body 10, the earpiece 30 may become close to the user's mouth. Thus, in the case in which the retractable cable is drawn out from the main body 10 by a predetermined distance 11 in a state in which the earpiece 30 is installed in the sub-body 20, the controller 180 may activate the function of the microphone 120.

FIG. 19 illustrates an example in which the volume of a sound output from the earpiece when the earpiece serves as a speaker.

Referring to FIG. 19, in a state in which the earpiece 30 is installed in the sub-body 20, the earpiece 30 may serve as a speaker. The controller 180 may provide control such that the sub-body 20 with the earpiece 30 installed therein is drawn out from the main body 10 through the retractable cable 40. The second sensing unit 142 of the main body 10 may sense a drawn-out or inserted state of the sub-body based on the lateral end of the main body 10. In addition, when the second sensing unit 142 senses that the sub-body 20 is drawn out from the main body 10, the second sensing unit 142 may check even a length of the retractable cable 40 drawn out from the main body 10.

Accordingly, while the earpiece 30 is outputting a sound in the speaker mode, the controller 180 may adjust the volume of the output sound depending on the length of the sub-body 20 drawn out from or inserted into the main body 10.

For example, referring to FIG. 19, when a length of the sub-body 20 drawn out from the main body 10 is 12, the controller 180 may adjust the sound to be output with volume 5 (S5). Meanwhile, when the sub-body 20 is drawn out from the main body 10 by a length 13 greater than the lens 12, the controller 180 may adjust the sound to be output with volume 8 (S6).

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

SEQUENCE LISTING FREE TEXT

100: a wireless headset 10: main body
20: sub body 30: earpiece
200: external audio source

The invention claimed is:

1. A wireless headset comprising:
a main body;
a sub-body detachably attached to an end of the main body;
a retractable cable being installed in the main body, the retractable cable connecting the main body to the sub-body;
a first wireless interface being configured to perform wireless communication with an external audio source;
an earpiece detachably attached to the sub-body and configured to output a sound wiredly, the earpiece including a second wireless interface configured to perform wireless communication with the first wireless interface;
a first sensing unit being positioned in the earpiece, the first sensing unit configured to sense whether the earpiece is separated from or coupled to the sub-body; and
a controller configured to activate the second wireless interface when the earpiece is separated from the sub-body,
wherein the earpiece is configured to output the sound wirelessly when the second wireless interface is activated,
wherein the sub-body includes:
a holder connected to the retractable cable; and
an opening formed in the holder, and
wherein the earpiece includes:

a first portion being accommodatable in the holder; and
a second portion connected to a rear portion of the first portion, the second portion being fittable in the opening.

2. The wireless headset of claim 1,
wherein the controller is configured to control:
the first wireless interface to receive an audio signal from the external audio source; and
the earpiece to output the sound corresponding to the audio signal.

3. The wireless headset of claim 1, wherein the first wireless interface and the second wireless interface comprise at least one among a Bluetooth interface, a Wi-Fi interface, and near-field communication (NFC) interface.

4. The wireless headset of claim 1, wherein the earpiece is coupled to or separated from the sub-body by predetermined elasticity.

5. The wireless headset of claim 1, wherein the earpiece further comprises a microphone, and
wherein, when the retractable cable is drawn out from the main body by a predetermined length, the controller activates the microphone.

6. The wireless headset of claim 1, wherein the main body is a neck band-type body so as to be wearable around a user's neck.

7. The wireless headset of claim 1, wherein the earpiece comprises a speaker module,
wherein the speaker module is positioned in the first portion of the earpiece, and
wherein the speaker module faces a front of the first portion.

8. The wireless headset of claim 7, further comprising a second sensing unit positioned in the main body,
wherein the second sensing unit is configured to sense whether the retractable cable has been drawn out from or inserted into the main body.

9. The wireless headset of claim 8, wherein the second sensing unit includes a magnetic material.

10. The wireless headset of claim 8, wherein the controller is configured to control the earpiece to be operated in a speaker mode, when the earpiece is attached to the sub-body and the sub-body is attached to the main body.

11. The wireless headset of claim 10, wherein, when the earpiece is separated from the sub-body so the speaker mode is switched to the wireless mode while the sound is being output in the speaker mode, the controller changes sound output in accordance with the wireless mode.

12. The wireless headset of claim 10, wherein the controller controls a sound output volume in the speaker mode depending on a length of the retractable cable drawn out from or inserted into the main body.

13. The wireless headset of claim 8, wherein the controller is configured to control the earpiece to be operated in a wireless mode, when the earpiece is detached from the sub-body and the sub-body is attached to the main body.

14. The wireless headset of claim 8, wherein the controller is configured to control the earpiece to be operated in a wired mode, when the earpiece is attached to the sub-body and the sub-body is detached from the main body.

15. The wireless headset of claim 14, wherein, when the earpiece is separated from the sub-body while the sound is being output in the wired mode, the controller temporarily stops outputting the sound, and when the earpiece is worn on the user's ears, the controller resumes outputting the stopped sound.

16. The wireless headset of claim 14, wherein, when the earpiece is separated from the sub-body so the wired mode is switched to the wireless mode while the sound is being output in the wired mode, the controller maintains sound output conditions of the wired mode.

17. The wireless headset of claim 8, wherein the controller is configured to control the earpiece to be operated in the wireless mode, when the earpiece is detached from the sub-body and the sub-body is detached from the main body.

18. A method of controlling a wireless headset, the method comprising:
receiving an audio signal from an external audio source via a first wireless interface;
sensing, via a first sensing unit, whether an earpiece is coupled to or separated from a sub-body;
outputting, via the earpiece, a sound corresponding to the audio signal wiredly when the earpiece is coupled to the sub-body;
activating a second wireless interface when the earpiece is separated from the sub-body; and
outputting, via the earpiece, the sound corresponding to the audio signal wirelessly when the second wireless interface is activated,
wherein the sub-body is detachably attached to an end of a main body of the wireless headset by a retractable cable, the earpiece is detachably attached to the sub-body, the first sensing unit is positioned in the earpiece, the sub-body includes a holder connected to the retractable cable, the sub-body includes an opening formed in the holder, the earpiece includes a first portion being accommodatable in the holder, the earpiece includes a second portion connected to a rear portion of the first portion, and the second portion being fittable in the opening.

* * * * *